(12) United States Patent
Goyal et al.

(10) Patent No.: US 12,259,404 B2
(45) Date of Patent: Mar. 25, 2025

(54) APPARATUS FOR DETECTING A CRITICAL FALL

(71) Applicant: Hilti Aktiengesellschaft, Schaan (LI)

(72) Inventors: Varnim Goyal, Kaufering (DE); Bernd Ziegler, Schwabmuenchen (DE)

(73) Assignee: Hilti Aktiengesellschaft, Schaan (LI)

( * ) Notice: Subject to any disclaimer, the term of this patent is extended or adjusted under 35 U.S.C. 154(b) by 568 days.

(21) Appl. No.: 17/761,519

(22) PCT Filed: Sep. 21, 2020

(86) PCT No.: PCT/EP2020/076248
§ 371 (c)(1),
(2) Date: Mar. 17, 2022

(87) PCT Pub. No.: WO2021/063720
PCT Pub. Date: Apr. 8, 2021

(65) Prior Publication Data
US 2022/0373573 A1 Nov. 24, 2022

(30) Foreign Application Priority Data
Oct. 1, 2019 (EP) .................... 19200689

(51) Int. Cl.
*G01F 15/18* (2006.01)
*G01P 15/18* (2013.01)
*H02J 7/00* (2006.01)
(52) U.S. Cl.
CPC ........... *G01P 15/18* (2013.01); *H02J 7/0029* (2013.01)

(58) Field of Classification Search
CPC ...... G01P 15/18; G01P 15/06; G01P 15/0891; H02J 7/0029; Y02E 60/10; H01M 10/48;
(Continued)

(56) References Cited
U.S. PATENT DOCUMENTS 9,000,543 B2   4/2015  Jeong et al.
2005/0077877 A1*  4/2005  Cawthorne ........... H02J 7/0029
                                                              320/128
(Continued)

FOREIGN PATENT DOCUMENTS

CN          1806177 A    7/2006
CN        101065674 A   10/2007
(Continued)

OTHER PUBLICATIONS

International Search Report of PCT/EP2020/076248, dated Nov. 19, 2020.

*Primary Examiner* — Paul Dinh
(74) *Attorney, Agent, or Firm* — Davidson Kappel LLC

(57) ABSTRACT

An apparatus contains an inertial body held by three electrical conductors along the three principal inertial axes, wherein a voltage is applied to each of the three electrical conductors and are configured such that when a predetermined acceleration threshold value for the inertial body is reached the conductivity of at least one electrical conductor is impaired such that the reaching of a predetermined threshold value is detectable by the voltage measuring device. A rechargeable battery having an apparatus for detecting a critical fall and a method involving detecting three voltages are also provided.

8 Claims, 4 Drawing Sheets

(58) Field of Classification Search
CPC ........... H01M 2200/00; H01M 10/425; H01M 2010/4271; H01M 2220/30; H01M 2220/00
USPC ........................................................ 320/162
See application file for complete search history.

(56) References Cited

U.S. PATENT DOCUMENTS

| | | |
|---|---|---|
| 2006/0116848 A1 | 6/2006 | Clifford et al. |
| 2011/0315834 A1 | 12/2011 | Lukic et al. |
| 2016/0222946 A1 | 8/2016 | Krings et al. |
| 2017/0232280 A1 | 8/2017 | Carroccia |

FOREIGN PATENT DOCUMENTS

| | | |
|---|---|---|
| CN | 102297326 A | 12/2011 |
| CN | 105531592 A | 4/2016 |
| CN | 109074718 A | 12/2018 |
| DE | 11 2011 104033 T5 | 9/2013 |
| DE | 102015208252 A1 | 11/2016 |
| DE | 202017102423 U1 | 7/2018 |
| WO | WO2017180979 A1 | 10/2017 |

* cited by examiner

APPARATUS FOR DETECTING A CRITICAL FALL

The present invention relates to an apparatus for detecting a critical fall having at least one voltage measuring device.

Furthermore, the present invention relates to a method for detecting a critical fall.

In addition, the present invention relates to a rechargeable battery having an apparatus for detecting a critical fall containing control electronics having at least one voltage measuring device, wherein the rechargeable battery contains a control device having a discharging device and also at least one energy storage device.

BACKGROUND

Modern power tools, such as hammer drills, saws, grinding devices or the like, and also rechargeable batteries, which can be connected to the power tools as a power supply, are usually of very robust design and show hardly any damage after a fall.

SUMMARY OF THE INVENTION

However, after a long fall from a particularly great height onto a hard or non-elastic floor, damage to the power tool and/or a rechargeable battery can occur as a result. This damage may not be directly visible or noticeable to a user of the power tool and/or the rechargeable battery. Damage to the power tool and/or the rechargeable battery that is not visible or not noticeable by a user can, however, pose a problem, since the functionality or mode of operation of the power tool and/or the rechargeable battery may no longer exist. For the user, however, it is not always easy to determine whether a fall or drop of one of the power tools and/or the rechargeable battery has caused damage and whether further use of the power tool and/or the rechargeable battery is still sufficiently safe.

It is an object of the present invention to provide an apparatus for detecting a critical fall having at least one voltage measuring device, a rechargeable battery and a method for detecting a critical fall, which can be used to solve the aforementioned problem and to clearly detect a critical fall or drop.

The present invention provides an apparatus for detecting a critical fall having at least one voltage measuring device.

According to the invention, the apparatus contains at least one inertial body that is held by three electrical conductors along the three principal inertial axes of the inertial body, wherein a voltage is applied to each of the three electrical conductors and the three electrical conductors are configured such that when a predetermined acceleration threshold value for the inertial body is reached the conductivity of at least one electrical conductor is impaired such that the reaching of a predetermined threshold value for at least one voltage is detectable by the voltage measuring device.

A fall from a critical (i.e. great) height leads to a sudden and relatively sharp deceleration of the falling object on the substrate that the apparatus hits. This deceleration on the substrate corresponds to a sharp acceleration of the falling apparatus. The longer the fall, the greater the acceleration of the apparatus. The inertial body set in motion by the sufficiently great acceleration causes the electrical conductors to break, which means that voltage is no longer measured. In the event that voltage is no longer measured in at least one conductor, it can be assumed that the acceleration is sufficiently great and consequently that the apparatus has undergone a critical fall.

The three electrical conductors form three different circuits. If the conductivity of an electrical conductor is sufficiently impaired, this can lead to an interruption of the corresponding circuit.

The inertial body may be a sphere. The inertial body configured as a sphere can contain three passages for each of the three conductors, the three passages being able to be arranged orthogonally with respect to one another.

According to one advantageous embodiment of the present invention, it may be possible for at least one electrical conductor to be interrupted when a predetermined acceleration threshold value for the inertial body is reached. An interruption of an electrical conductor leads to a complete voltage drop in the electrical conductor or in the corresponding circuit, so that clearly the apparatus has undergone a sufficiently great acceleration and consequently a critical fall.

According to a further advantageous embodiment of the present invention, it may be possible for a signal device to be included that transmits at least one signal when a predetermined threshold value for at least one voltage is reached. In this way, a critical fall by the apparatus can be effectively indicated to the user of the apparatus. The signal device can be an LED display, an audible signal transmitter or a radio device. It is possible for the radio device to be configured in the form of Bluetooth, NFC (Near Field Communication) or some other suitable wireless communication technology.

In addition, the present invention provides a rechargeable battery having an apparatus for detecting a critical fall containing control electronics having at least one voltage measuring device, wherein the rechargeable battery contains a control device having a discharging device and also at least one energy storage device.

According to the invention, there is provision for the apparatus for detecting a critical fall to contain at least one inertial body that is held by three electrical conductors along the three principal inertial axes of the inertial body, wherein a voltage is applied to each of the three electrical conductors and the three electrical conductors are configured such that when a predetermined acceleration threshold value for the inertial body is reached the conductivity of at least one electrical conductor is impaired such that the reaching of a predetermined threshold value for at least one voltage is detectable by the voltage measuring device.

According to one advantageous embodiment of the present invention, it may be possible for the at least one energy storage device to be at least partially discharged by the discharging device if the reaching of a predetermined threshold value for at least one voltage is detectable by the voltage measuring device. This can prevent further use of the rechargeable battery as a power supply and at the same time indicate to the user of the rechargeable battery that there is possible damage to the rechargeable battery.

The discharging apparatus may be formed by at least one capacitor, at least one transistor and/or at least one electrical resistor.

According to a further advantageous embodiment of the present invention, it may be possible for the control electronics and/or control device to be configured such that charging of the at least one energy storage device with electrical energy is prevented if the reaching of a predetermined threshold value for at least one voltage is detectable by the voltage measuring device.

In addition, the present invention provides by a method for detecting a critical fall.

According to the invention, the method contains the following method steps:
- detecting a first, second and third voltage, which is applied to a first, second and third electrical conductor, respectively, wherein the first conductor runs along a first principal inertial axis of an inertial body, the second conductor runs along a second principal inertial axis of an inertial body and the third conductor runs along a third principal inertial axis of an inertial body; and
- detecting a predetermined threshold value for the first, second or third voltage by means of at least one voltage measuring device if, when a predetermined acceleration threshold value for the inertial body is reached, the conductivity of at least one electrical conductor is impaired.

According to one advantageous embodiment of the present invention, it may be possible for at least one signal to be transmitted by a signal device if a predetermined threshold value for at least one voltage is detectable.

Further advantages can be found in the following description of the figures. Various exemplary embodiments of the present invention are shown in the figures. The figures, the description and the claims contain numerous features in combination. A person skilled in the art will expediently also consider the features individually and combine them to produce useful further combinations.

DETAILED DESCRIPTION

Figure 1:
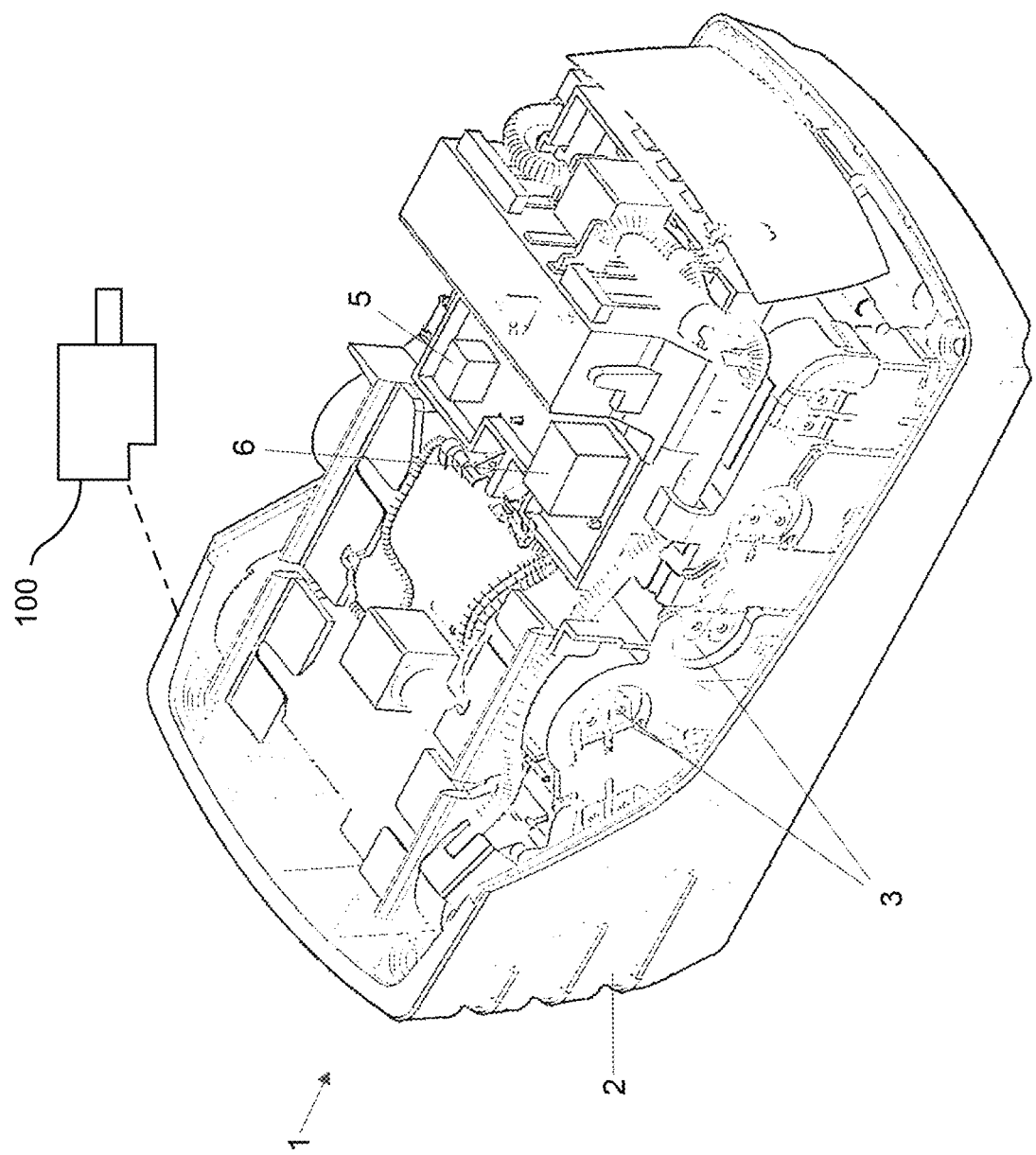
FIG. 1 shows a perspective view of a rechargeable battery with an apparatus according to the invention.

FIG. 1 depicts a rechargeable battery 1. The rechargeable battery 1 can, for example, be detachably connected to a power tool in order to supply the power tool with electrical energy. The power tool is shown solely schematically as 100 in the figures.

The rechargeable battery 1 essentially contains a housing 2, a number of energy storage cells 3, a discharging device 4 and a control device 5. The energy storage cells 3 are used for receiving, storing and indicating electrical energy or voltage. The discharging device 4 is configured in the form of a powerful capacitor and is used for the controlled discharge of the energy storage cells 3, i.e. the removal of the electrical energy from the energy storage cells 3. The control device 5 is used for controlling and regulating various functions of the individual components of the rechargeable battery 1 or the entire rechargeable battery 1.

The energy storage cells 3 can also be referred to as rechargeable battery cells and can be based on lithium-ion technology.

Furthermore, the rechargeable battery 1 contains an apparatus 6 for detecting a critical fall. As indicated in FIG. 1, the apparatus 6 for detecting a critical fall is connected to the control device 5 of the rechargeable battery 1. The control device 5 is connected to the rechargeable battery cells 3 such that electrical energy can pass from the rechargeable battery cells 3 to the control device 5. The connection to the control device 5 supplies the apparatus 6 with a first, second and third voltage V1, V2, V3. Furthermore, data and information can be exchanged between the apparatus 6 and the control device 5 of the rechargeable battery 1 in the form of signals.

Figure 2:
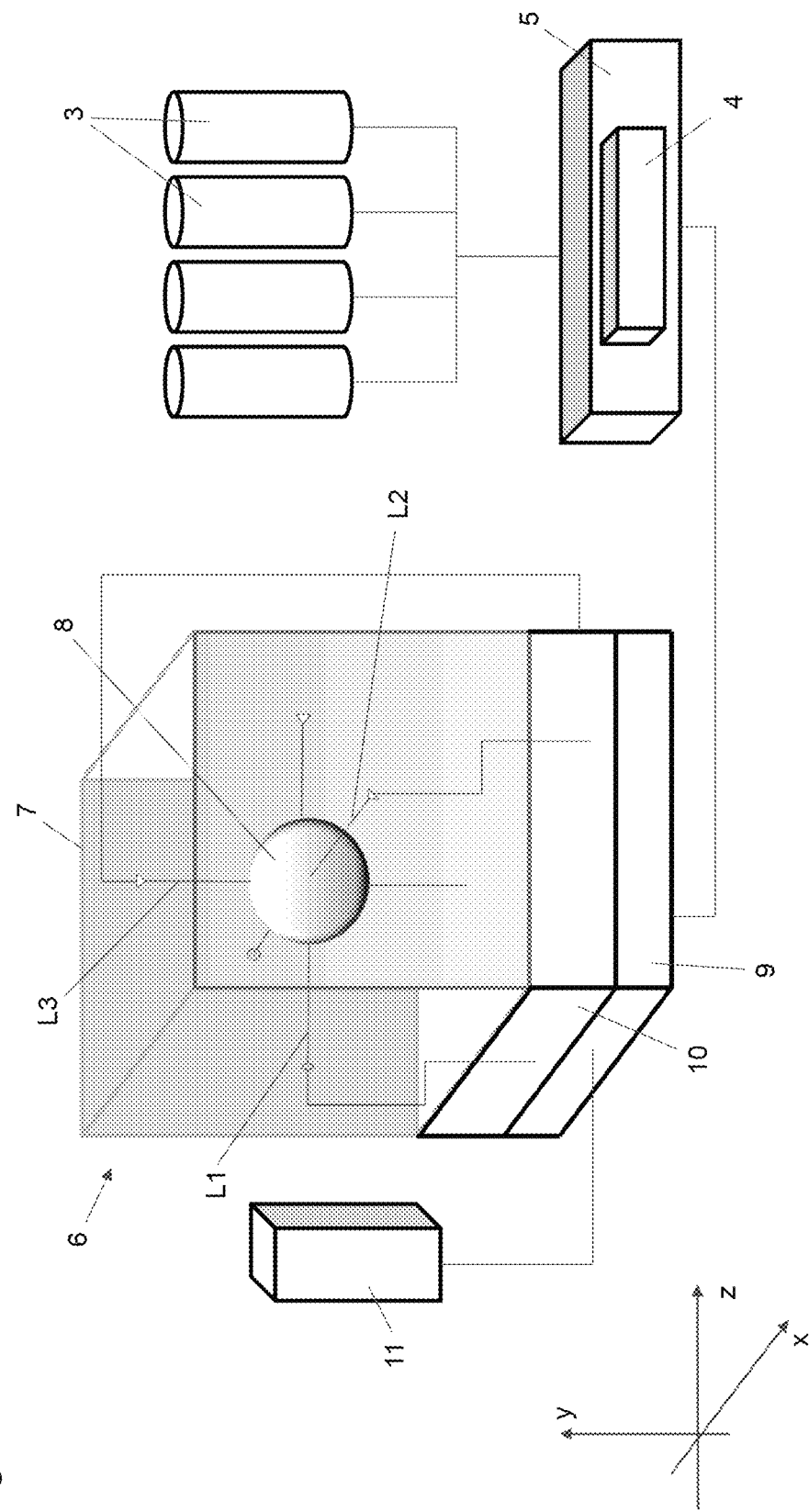
FIG. 2 shows a schematic view of the apparatus according to the invention in a first state.

FIG. 2 depicts the apparatus 6 for detecting a critical fall in a first exemplary embodiment. The apparatus 6 essentially contains a frame 7, an inertial body 8, a first, second and third electrical conductor L1, L2, L3, control electronics 9 and a voltage measuring device 10. The control electronics 9 and the control device 5 are connected to one another for the purpose of interchanging data and information in the form of signals. The electrical conductors L1, L2, L3 can also be referred to as cables or lines and consist at least in part of a conductive material (e.g. copper) in order to allow an electrical current to flow.

The frame 7 contains a first, second, third, fourth, fifth, sixth, seventh, eighth, ninth, tenth, eleventh and twelfth frame edge. According to an alternative embodiment, instead of the frame 7 there may also be provision for an at least partially closed container or box.

In the exemplary embodiment shown, the inertial body 8 is configured as a sphere. However, it is also possible for the inertial body 8 to be configured in a different geometric shape, for example as a cuboid or cube.

The voltage measuring device 10 is positioned contrary to the direction y below the frame 7 and firmly connected to the frame 7 (cf. FIGS. 2 and 3). According to an alternative configuration, the voltage measuring device 10 may also be connected to the frame 7 at one point. It is also possible for the voltage measuring device 10 to be positioned physically separately from the frame 7.

Figure 3:
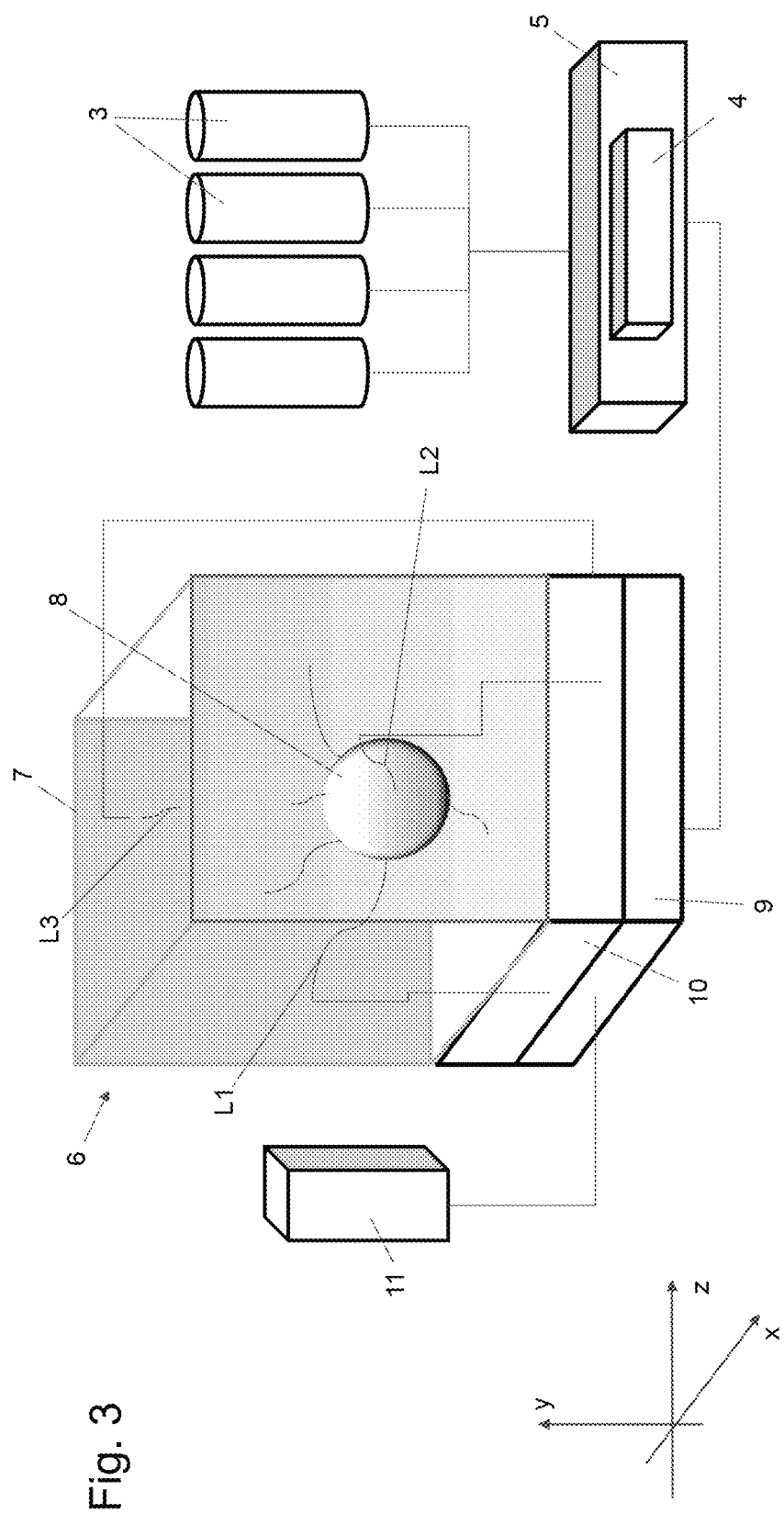
FIG. 3 shows a schematic view of the apparatus according to the invention in a second state.

As FIGS. 2 and 3 show, the inertial body 8 configured as a sphere is positioned in the center (i.e. in the middle) of the frame 7. So that the inertial body 8 is held in the center of the frame 7, the inertial body 8 contains a first, second and third passage. The passages can also be referred to as through-holes. The three passages of the inertial body 8 are each arranged orthogonally with respect to one another. In other words: the first passage extends in the z direction, the second passage extends in the x direction and the third passage extends in the y direction. The three passages are not illustrated in the figures.

The first passage takes the first electrical conductor L1 in the z direction, the second passage takes the second conductor in the x direction and the third passage takes the third conductor in they direction. The three conductors L1, L2, L3 thus each run orthogonally (i.e. almost at a right angle) with respect to one another.

The first, second and third conductors L1, L2, L3 are connected to the frame at two points each such that the inertial body 8 configured as a sphere, through which the three conductors L1, L2, L3 run, is held in the center of the frame 7. The three conductors L1, L2, L3 have a certain mechanical tautness or a certain tension. The exact location or attachment of the three conductors L1, L2, L3 on the frame 7 is not illustrated in the figures.

Figure 4:
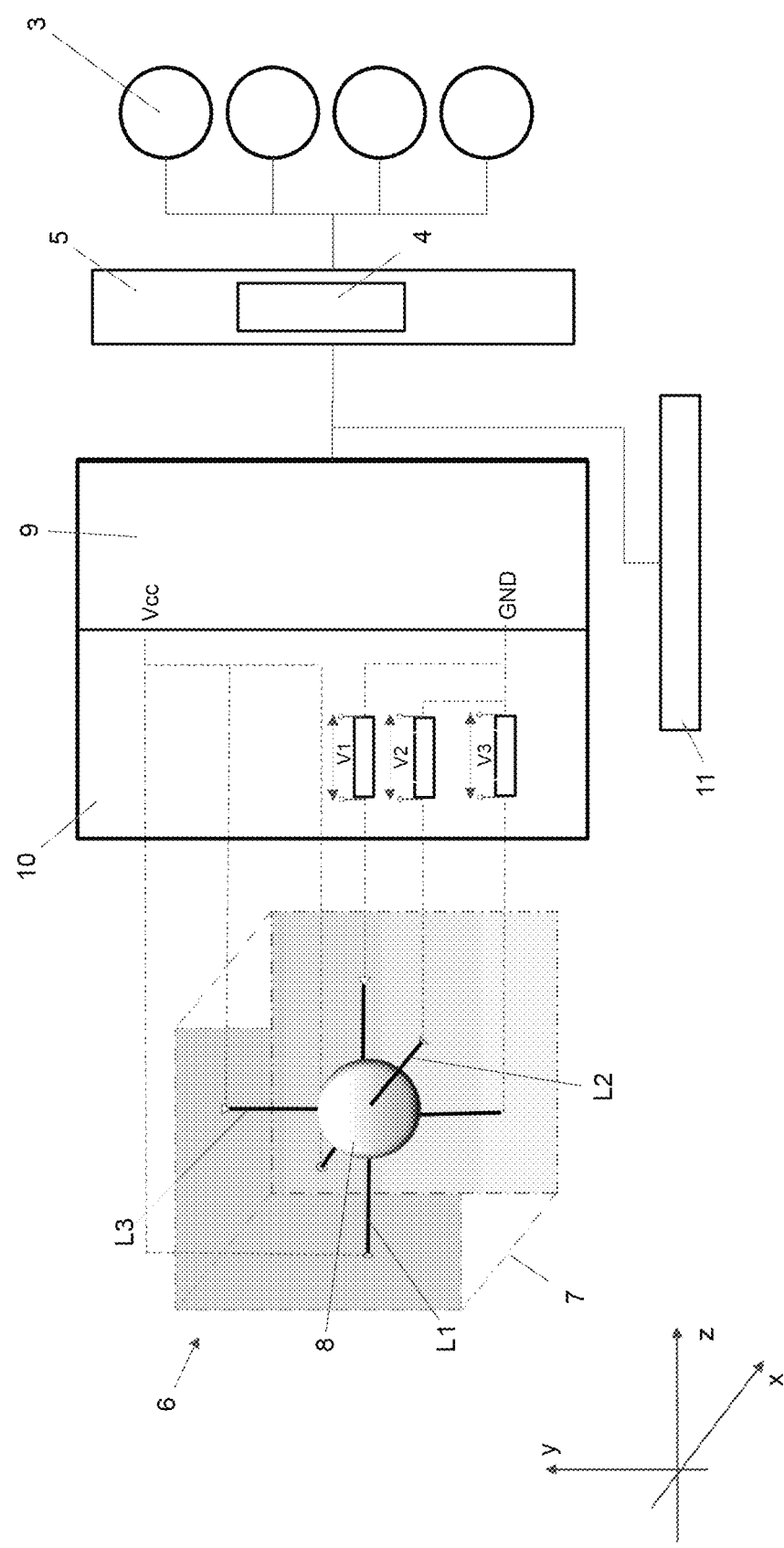
FIG. 4 shows the schematic view of the apparatus according to the invention in the first state together with three circuits and a control device.

As indicated in FIGS. 2 to 4, the respective ends of the first, second and third conductors L1, L2, L3 are connected to the voltage measuring device 10. As FIG. 4 shows, the voltage measuring device 10 is connected to the control electronics 9. The control electronics 9 of the apparatus 6 for detecting a critical fall are connected to the control device 5 of the rechargeable battery 1 such that electrical energy from the rechargeable battery cells 3 flows through the first, second and third conductors L1, L2, L3. The first conductor L1 therefore has a first voltage V1 applied to it, the second conductor L2 has a second voltage V2 applied to it and the third conductor L3 has a third voltage V3 applied to it. The voltage measuring device 10 detects changes in the first, second and third voltages V1, V2, V3. The voltage measuring device 10 can in particular detect when voltage is no longer applied to one of the three conductors L1, L2, L3 or when a voltage V1, V2, V3 is equal to zero.

In FIGS. 2 and 4, the apparatus 6 for detecting a critical fall is depicted in an immobile, i.e. stationary, state. The inertial body 8 is located approximately in the center or in the middle of the frame 7.

FIG. 3 depicts the apparatus 6 for detecting a critical fall in a state in which a certain acceleration acts on the apparatus 6. The accelerated state takes place when the apparatus 6 strikes a hard, inelastic surface after falling from a certain height. The associated sudden deceleration causes a negative acceleration on the apparatus 6. The acceleration of the apparatus 6 as a result of a fall and the physical properties of the inertial body 8 have the effect that the inertial body 8 is moved relative to the frame 7. The movement of the inertial body 8 relative to the frame 7, which is shown in FIG. 3, exerts a mechanical tensile force or a tension on at least one conductor L1, L2, L3. FIG. 3 depicts the situation in which this mechanical tensile force exceeds the tensile strength (i.e. breaking strength) and the third conductor L1, L2, L3 breaks. This interrupts the third circuit with the third voltage V3. The voltage measuring device 10 detects a change or a drop in the third voltage V3 in the third circuit. The change in the voltage is conveyed to the control electronics 9 in the form of an appropriate signal, so that the control electronics 9 detect a critical fall. The control electronics 9 of the apparatus 1 for detecting a critical fall can also route the information that a critical fall has occurred to the control device 5 of the rechargeable battery 1. The control device 5 of the rechargeable battery 1 can then take further measures.

Since the material of the first, second and third conductors has a certain tensile strength or breaking strength, the conductor L1, L2, L3 only breaks (i.e. the material of the conductor fails) at a certain tensile force. The tensile force necessary to break a conductor L1, L2, L3 is directly related to the value of an acceleration that is exerted on the apparatus 6 as a result of a fall. The tensile strength of the conductor L1, L2, L3 is chosen such that the conductor L1, L2, L3 only breaks from a critical drop height or after falling from a critical height.

It is therefore possible for the interruption of one of the three circuits, which is detectable by the voltage measuring device 10, to identify a fall from a critical drop height.

A critical drop height or a critical fall are defined such that the impact or the negative acceleration during impact can cause relevant damage to or in the rechargeable battery 1. Relevant damage is present in the case of a rechargeable battery 1, for example, when there is the risk of a short circuit.

According to a further exemplary embodiment, the discharging device 4 of the rechargeable battery 1 for the controlled discharge of the energy storage cells 3 can be actuated and activated by an appropriate signal from the control electronics 9 of the apparatus 6. The discharging device 4 discharges the energy storage cells 3 if the signal sent by the control electronics 9 corresponds to a significant voltage drop in one of the three circuits as a result of an interruption in at least one conductor L1, L2, L3. In other words: the discharging device 4 discharges the rechargeable battery cells 3 if a fall from a critical height was detected by a sudden voltage drop in one of the three conductors L1, L2, L3.

After the rechargeable battery cells 3 have been discharged, the control electronics 9 and/or control device 5 can prevent the rechargeable battery cells 3 from being charged with electrical energy again by a charging apparatus. The charging apparatus is not illustrated in the figures.

According to a further exemplary embodiment, a signal device 11 may be connected to the apparatus 6 for detecting a critical fall such that a signal indicating that a fall from a critical height has occurred can be output. The signal device 11 may be configured to transmit an audible, visual and/or electrical signal. The signal can also be a radio signal. The signal can also be sent to the control device 5 of the rechargeable battery 1 and cause further delivery of electrical energy from the rechargeable battery cell 3 to a load, for example a power tool connected to the rechargeable battery 1, to be prevented after a fall from a critical height has been detected. The power tool is not illustrated in the figures.

What is claimed is:

1. An apparatus for detecting a critical fall containing control electronics, the apparatus comprising:
    at least one voltage measuring device;
    at least one inertial body held by three electrical conductors along three principal inertial axes of the inertial body, a voltage being applied to each of the three electrical conductors, the three electrical conductors being configured such that when a predetermined acceleration threshold value for the inertial body is reached a conductivity of at least one electrical conductor is impaired such that reaching of a predetermined voltage threshold value for at least one voltage is detectable by the voltage measuring device.

2. The apparatus as recited in claim 1 wherein at least one electrical conductor is interrupted when the predetermined acceleration threshold value for the inertial body is reached.

3. The apparatus as recited in claim 1 further comprising a signal device transmitting at least one signal when the predetermined voltage threshold value is reached.

4. A rechargeable battery comprising:
    an apparatus for detecting a critical fall containing control electronics, the apparatus having at least one voltage measuring device;
    a controller having a discharging device; and
    at least one energy storage device;
    the apparatus including at least one inertial body held by three electrical conductors along three principal inertial axes of the inertial body, wherein a voltage is applied to each of the three electrical conductors and the three electrical conductors are configured such that when a predetermined acceleration threshold value for the inertial body is reached a conductivity of at least one electrical conductor is impaired such that reaching of a predetermined voltage threshold value for at least one voltage is detectable by the voltage measuring device.

5. The rechargeable battery as recited in claim 4 wherein the at least one energy storage device is at least partially discharged by the discharging device if the reaching of a predetermined voltage threshold value is detected by the voltage measuring device.

6. The rechargeable battery as recited in claim 4 wherein the control electronics or control device is configured such that charging of the at least one energy storage device with electrical energy is prevented if the reaching of the predetermined voltage threshold value is detected by the voltage measuring device.

7. A method for detecting a critical fall, the method comprising the following steps:
- detecting a first, second and third voltage applied to a first, second and third electrical conductor, respectively, the first conductor running along a first principal inertial axis of an inertial body, the second conductor running along a second principal inertial axis of the inertial body and the third conductor running along a third principal inertial axis of the inertial body; and
- detecting a predetermined threshold value for the first, second or third voltage by at least one voltage measuring device if, when a predetermined acceleration threshold value for the inertial body is reached, a conductivity of at least one electrical conductor is impaired.

8. The method as recited in claim 7 wherein at least one signal is transmitted by a signal device if a predetermined voltage threshold value for at least one voltage is detected.

* * * * *